United States Patent Office 2,843,583
Patented July 15, 1958

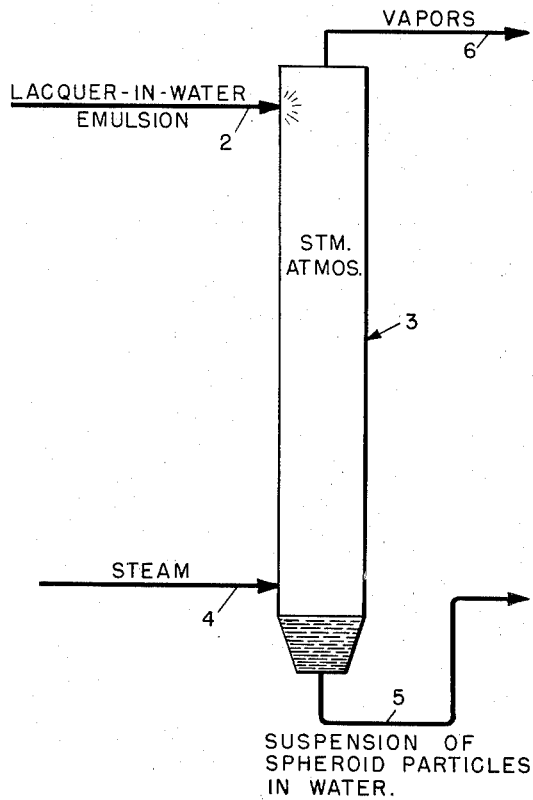

2,843,583
PREPARATION OF FINELY-DIVIDED CELLULOSE DERIVATIVE COMPOSITIONS

Robert S. Voris, Lemont, Ill., assignor to Hercules Powder Company, Wilmington, Del., a corporation of Delaware Application March 3, 1955, Serial No. 491,937

6 Claims. (Cl. 260—223)

This invention relates to the preparation of finely-divided cellulosic plastics. More particularly, this invention relates to the preparation of uniformly small, solid spheroid particles of organosoluble cellulose derivative compositions.

The preparation of plastic coating compositions is normally accomplished by dissolving the plastic and modifiers in a suitable solvent, and films and coatings then are formed by evaporation of the solvent from a thin layer of the resulting composition. Serious economic limitations on this method are the solubility characteristics of the plastic in the solvent, the relatively high viscosity of the solutions, and the cost of solvent, whether lost or recovered. An alternate method, emulsification, still requires a solvent for the plastic.

In recent years a new method of applying coatings of vinyl resin compositions has met with wide acceptance, first in Germany and Great Britain, and more recently in the United States. This procedure involves dispersion of the plastic, in finely-divided form, with or without plasticizer in a monosolvent medium, and coatings of such dispersions laid down on various substrata are coalesced to continuous films by application of heat and/or pressure. The disadvantages of solvent application as listed above are thus eliminated. This method of applying plastic coatings has been limited to vinyl resin compositions since the vinyl plastics by virtue of their preparation by emulsion polymerization are easily recovered in the finely-divided state at little added expense. No examples are known of the use of finely-divided cellulosic plastics in this manner because such plastics are not so easily produced in a finely-divided state as are vinyl plastics. In fact, no satisfactory means of preparing cellulosic plastics in the same state of subdivision has been developed.

Two processes have been tried for the preparation of cellulosic plastics in a finely-divided form. They are mechanical grinding and spray drying of a solution of the plastic. Mechanical grinding is entirely inadequate for obtaining a particle size suitable for use in film formation since it results in a powder of relatively large average particle size and irregularly shaped particles. Such a powder does not produce a homogeneous film, and the powder is characterized by a low bulk density which also makes efficient film formation difficult.

Spray drying a solution of the plastic produces better results than mechanical grinding, but it has also proved to be inadequate. The average particle size obtained by such a process is from 15 to 30 microns, with maximum sizes ranging from 65 to 180 microns in diameter. Microscopic examination of the product revealed that the solution-sprayed cellulosic are irregularly shaped, consisting of solid particles, hollow spheres, and fine threads. The bulk density is rather low, ranging from 0.06 to 0.14 g./ml. An additional drawback to this method is the relatively large amount of solvent required in the solution and to be recovered per pound of product.

It is an object of this invention to provide a novel process for preparing film-forming plastics in a finely-divided form and having properties superior to the prior art preparations.

It is another object of this invention to provide a novel process for preparing cellulosic plastics suitable for use in coating compositons heretofore not available in the prior art.

In my copending application, Serial No. 225,271, filed May 8, 1951, a method is disclosed for preparing finely-divided cellulosic plastics. In this method, cellulose derivative plastic is dispersed in a lacquer-in-water emulsion containing, in addition to the plastic and water, an emulsifying agent and a low-boiling water-immiscible solvent for the plastic that can be emulsified without precipitation of the dispersed plastic. The resulting emulsion is then sprayed in fine droplet or mist form into a heated gaseous medium that acts as a desiccating vehicle. The resulting dried plastic is then recoverable in the form of fine particles or a powder.

Thus, there are two problems involved in producing fine particles of a cellulose derivative. One has to do with the difficulty encountered in producing the very fine particles required for commercial acceptance with a high degree of uniformity and the other has to do with the production of these very fine particles of cellulose derivative in a manner which is economically attractive to gain commercial acceptance.

In commercial production, fine particles of cellulose derivative plastic are required for use primarily in hydrosol, organosol, or plastisol coatings with other significant application being in the fields of paper and textile sizing, inks, flame-spraying and plastics. For these uses, fine particles of 1–50 micron size and preferably 1–15 micron size either in slurry or powder form are required. Therefore, it is a primary object of this invention to provide a process for the production of such particles which is simple, economical, reliable, and in which the particles possess a high degree of uniformity and stability. Other objects of the invention will appear hereinafter, the novel features and combination being set forth in the appended claims.

Generally described, in accordance with this invention, it has been discovered that uniformly small, solid spheroid particles of organosoluble cellulose derivative compositions are prepared by spraying lacquer-in-water emulsions of organosoluble cellulose derivative compositions into a steam atmosphere. One embodiment in accordance with this invention comprises emulsifying a lacquer in water to form a lacquer-in-water emulsion, said lacquer containing organosoluble cellulose derivative composition dissolved in a low-boiling substantially water-immiscible solvent therefor, continuously spraying the lacquer-in-water emulsion at a temperature below the boiling point of the lacquer solvent therein into an enclosed vessel containing a steam atmosphere, continuously and simultaneously introducing a quantity of steam into the enclosed vessel at least sufficient in total enthalpy content to vaporize substantially all solvent present in the emulsified lacquer and precipitate the organosoluble cellulose derivative composition as uniformly small, solid spheroids, continuously forming a suspension of the precipitated solid spheroids thus formed in water in the enclosed vessel, continuously withdrawing vapors consisting essentially of a mixture of solvent vapor and water vapor from the enclosed vessel, and withdrawing the water suspension of solid spheroids from the enclosed vessel. In a preferred embodiment of the invention substantially all of the organosoluble cellulose derivative composition is precipitated as uniformly small solid spheroids having diameters not exceeding 5 microns. When hydrosol compositions are desired, the water suspension of solid spheroids prepared in accordance with this invention can be employed directly, after making whatever adjustment is necessary or desirable in water content of the suspension for proper application consistency. However, when organosol, plastisol, or flame-spraying techniques of application are intended, it becomes necessary according to this invention to recover the solid spheroids from the water suspension thereof.

A preferred embodiment of the invention has been chosen for purposes of illustration and description and is shown diagrammatically in the accompanying drawing where valves, gages and other auxiliary equipment have been omitted for the sake of simplicity. Referring to the drawing, a lacquer-in-water emulsion of the cellulose derivative composition, fed through line 2, is sprayed continuously into an unpacked steam stripping column 3, containing a steam atmosphere at atmospheric pressure. Simultaneously steam is fed continuously through line 4 into stripping column 3. The solvent present in the sprayed emulsion is flash-evaporated by the steam in the column, thereby causing the cellulose derivative composition to precipitate as uniformly tiny solid spherical particles. These tiny solid spheroids suspended in water settle to the base of the column, and the suspension is drawn off, either continuously or intermittently, as desired, through line 5. Vapors, consisting essentially of solvent vapor and water vapor are continuously removed from column 3 through line 6, and are then readily recovered by conventional means for re-use in the process. The suspension of uniformly small, solid spheroids of organosoluble cellulose derivative composition is dewatered by filtration, centrifugation, or other equivalent means, and the cake or mass of finely-divided cellulose derivative composition thus formed is then dried by any convenient means.

The invention is illustrated by the following specific embodiment in which uniformly small, solid spheroids of organo-soluble cellulose acetate were prepared in accordance with this invention. It will be understood, of course, that the invention is susceptible to different modified embodiments which come within the scope of the appended claims.

EXAMPLE

A lacquer was prepared by dissolving 7.7 parts by weight of cellulose acetate LL-1 (Hercules Powder Company, Wilmington, Delaware), and 0.2 part by weight of sodium dioctyl sulfosuccinate (Aerosol OT, American Cyanamid Company, New York, New York), in a solvent mixture consisting of 54 parts by weight of methylene chloride and 6 parts by weight of commerical ethyl alcohol. Thirty (30) parts by weight of water were then added to the above lacquer solution with vigorous agitation, and the resulting mixture was passed through a colloid mill to prepare a lacquer-in-water emulsion.

The resulting emulsion was then sprayed at about room temperature into a stream atmosphere in an unpacked steam-stripping column as illustrated in the drawing, and simultaneously therewith steam was introduced into the column at a rate equivalent to 2.26 parts of steam by weight for each part by weight of total liquid content of the sprayed emulsion. The lacquer solvent was thereby flash-evaporated from the emulsion, and the cellulose acetate was precipitated as tiny, solid spheroids and formed a suspension in water introduced in the emulsion augmented by water resulting from steam condensation. Examination and analysis of the water suspension thus formed showed that substantially all of the cellulose acetate was in the form of tiny spheroids having diameters between 1 and 5 microns, and the suspension contained approximately 0.1% by weight of methylene chloride and 0.1% by weight of ethyl alcohol, thus establishing that the steam-stripping operation caused evaporation of substantially all of the lacquer solvent in the emulsion.

The suspension of tiny spheroids of cellulose acetate was continuously withdrawn from the bottom of the column by means of a constant level syphon, after which it was dewatered by centrifugation, and the wet centrifuge cake was spread out and tray dried in an air oven.

Vapors consisting essentially of a mixture of methylene chloride, ethyl alcohol and water vapors were continuously withdrawn from the top of the stripping column, condensed, and the methylene chloride and ethyl alcohol were recovered by conventional means for re-use in the process.

The finely-divided dry cellulose acetate prepared as set forth above was employed to prepare a hydrosol dispersion having the following composition:

| Ingredients: | Parts by weight |
| --- | --- |
| Finely-divided cellulose acetate | 60 |
| Methyl phthalyl ethyl glycolate | 40 |
| Bentonite clay | .02 |
| Water | 100 |

The water, bentonite, methyl phthalyl ethyl glycolate and cellulose acetate were added in the order stated to a ball mill, and the mixture was milled for 16 hours. A thick, creamy, freely-pourable dispersion was thus formed, and films of this dispersion cast on glass and dried and fused under infrared lamps were clear, smooth and mechanically strong, having the following properties:

| | |
| --- | --- |
| Tensile strength | 2750 lb./sq. in. |
| Elongation | 9%. |
| Elastic modulus | 130,000 lb./sq. in. |

The folowing table lists, by way of example, some typical lacquer-in-water emulsions of organosoluble cellulose derivatives useful in the practice of this invention.

*Table of emulsions*

| | Parts by Weight | | | | | |
| --- | --- | --- | --- | --- | --- | --- |
| Emulsion No. | 1 | 2 | 3 | 4 | 5 | 6 |
| Ingredients: | | | | | | |
| Ethyl Cellulose N-22* | 20 | 20 | | | | |
| RS Nitrocellulose, ½ sec.* | | | 15 | | | |
| SS Nitrocellulose, ½ sec.* | | | | 15 | 12.3 | 9 |
| Methylene Chloride | 72 | 72 | 55.2 | 55.2 | 55.2 | 55.2 |
| Ethyl Alcohol | 8 | | | | | |
| Methyl Alcohol | | 8 | | | | |
| Ethyl Acetate | | | 29.8 | | | |
| Methyl Acetate | | | | 29.8 | 29.8 | 29.8 |
| Dibutyl Phthalate | | | | | 2.7 | |
| Dicyclohexyl Phthalate | | | | | | 6 |
| Sodium Dioctyl Sulfosuccinate | 0.1 | | | 0.15 | 0.12 | 0.09 |
| Sodium Lauryl Sulfate | | 0.2 | | | | |
| Polyoxyalkylene Sorbitan Monostearate | | | 0.6 | | | |
| Water | 50 | 50 | 40 | 50 | 50 | 50 |

*Hercules Powder Company, Wilmington, Delaware.

A convenient method for making the lacquer-in-water emulsions employed in practicing this invention consists is dissolving the organosoluble cellulose derivative and emulsifier, together with any desired auxiliary modifiers such as plasticizers, resins, and the like as desired in the solvent to form a lacquer, and then adding the required amount of water to the lacquer with vigorous agitation to prepare an emulsion premix. The emulsion premix is then passed through a colloid mill or homogenizer to form a uniform, stable lacquer-in-water emulsion. If desired, emulsification can be effected by supersonic means, or even by simple agitation in some cases. In preparing the premix before emulsification, several schemes are operable: (1) add water and emulsifier to the lacquer, (2) add water to the lacquer phase containing emulsifier, (3) add solvent to a mixture of water, cellulose derivative and emulsifier, or (4) add cellulose derivative to an emulsion of solvent and water. Method 2 is preferred, but the process is not restricted to this method.

The method in accordance with this invention is applicable for preparing uniformly small, solid spheroids of any organosoluble cellulose derivative. It is, of course, well understood in the art what is meant by organosoluble cellulose derivative, and the term as employed herein and in the claims has the same significance and meaning as employed in the art. Briefly, it means any cellulose derivative which can be dissolved in an organic solvent. In general, organo-soluble cellulose derivatives are esters, or ethers, or mixed ether-esters, and generally have a degree of substitution of at least about two substituent groups per glucose anhydride unit in the cellulose. Examples of suitable organosoluble cellulose derivatives are cellulose acetate, cellulose propionate, cellulose butyrate, cellulose benzoate, cellulose stearate, cellulose crotonate, cellulose acetate propionate, cellulose acetate butyrate, cellulose acetate crotonate, cellulose acetate benzoate, nitrocellulose, ethyl cellulose, benzyl cellulose, ethyl methyl cellulose, ethyl benzyl cellulose, ethyl hydroxyethyl cellulose, hydroxyethyl cellulose acetate, ethyl cellulose acetate, ethyl cellulose crotonate, benzyl cellulose acetate, and the like.

It is an essential feature of this invention that the organosoluble cellulose derivative be dissolved in a low-boiling substantially water-immiscible solvent therefor. This is necessary in order to insure effective flash evaporation of substantially all solvent present in the lacquer-in-water emulsion when the emulsion is sprayed into the steam atmosphere.

In general, any solvent or solvent mixture having a boiling point below the boiling point of water which when mixed with water will separate therefrom to form a two-layer system, one layer being an aqueous phase and the other layer being a solvent phase, is suitable in the practice of this invention. Suitable solvents and solvent mixtures within this category include, for example, chlorinated hydrocarbons such as ethyl chloride, methylene chloride, ethylene chloride, trichloroethylene, carbon tetrachloride, and the like, lower aliphatic ethers such as dimethyl ether, diethyl ether, methyl ethyl ether, allyl ethyl ether, butyl ethyl ether, diisopropyl ether, and the like, methyl ethyl ketone, benzene, and mixtures of any of the above solvents with a low-boiling alcohol such as methanol, ethyl alcohol, n-propyl alcohol, isopropyl alcohol, or with such low boiling esters as methyl formate, methyl acetate, ethyl acetate, ethyl propionate, and the like. The above typical solvents and solvent mixtures are considered to be substantially water-immiscible for the purposes of this invention, and have boiling points below the boiling point of water.

With an ethyl cellulose or cellulose acetate formulation, it is preferred to employ a solvent containing from 80 to 95 parts by weight of methylene chloride and from 20 to 5 parts by weight of a lower aliphatic alcohol such as methanol, ethanol, or propanol. With a nitrocellulose formulation, it is preferred to employ a solvent containing from 60 to 70 parts by weight of methylene chloride and from 40 to 30 parts by weight of a lower aliphatic ester such as methyl acetate or ethyl acetate.

In general, lacquer solutions for the purposes of this invention can contain up to about 10% by weight of cellulose acetate or other cellulose organic esters or mixed ether-esters, up to about 20% by weight of ethyl cellulose or other cellulose ethers, and up to about 15% by weight of nitrocellulose. It will be understood, of course, that various customary auxiliary cellulose derivative modifiers such as plasticizers, resins, stabilizers, and the like are employed as necessary or desirable to obtain the properties required in the final product. Accordingly, unmodified organosoluble cellulose derivatives, per se, as well as compositions of such derivatives containing various customary auxiliary formulating ingredients such as plasticizers, resins, stabilizers, and the like come within the scope of this invention.

Experience has shown that satisfactory emulsification usually requires from about 30 parts to about 200 parts by weight of water for each 100 parts by weight of lacquer.

In order to form uniformly small, solid spheroids of organosoluble cellulose derivative compositions, the lacquer-in-water emulsions of this invention are sprayed into a steam atmosphere. As illustrated in the drawing and discussed hereinbefore, this is conveniently accomplished by injecting the emulsion into an unpacked steam-stripping column. It is important that the emulsion be kept below the boiling point of the solvent present in the emulsion until the emulsion is actually in contact with the steam in order to avoid coagulation of the emulsion in the delivery line or spray nozzle with consequent precipitation of undesirable particles such as lumps, strings or film fragments. Once the emulsion is in contact with the steam, there is substantially no tendency for such undesirable particles to form, and substantially all of the cellulose derivative composition is precipitated as tiny spheres or spheroid particles closely approaching spheres in shape. For this reason it is desirable to employ a jacketed delivery line and spray nozzle so that the temperature of the emulsion can be positively controlled below the boiling point of the solvent in the emulsion.

Although the temperature of the emulsion could be kept at any temperature between the freezing point of the emulsion and the boiling point of the solvent in the emulsion, it is apparent that optimum efficiency in the process dictates a temperature approaching the boiling point of the solvent in the emulsion. Very satisfactory operation has been obtained by maintaining the emulsion at about ordinary room or ambient temperatures in the delivery line and spray nozzle.

It is desirable to inject the emulsion as a fine mist or spray into the steam atmosphere in order to obtain the most efficient flash evaporation of the solvent, for this favors optimum uniformity in particle size. Any conventional means for breaking up a stream of liquid into spray droplets, such as fog nozzles, ordinary spray nozzles, or any other similar device are suitable for this purpose.

Steam must be supplied continuously to the process to provide a steam atmosphere and to furnish the heat energy necessary to vaporize the solvent present in the emulsified lacquer and precipitate the organosoluble cellulose derivative composition as uniformly small, solid spheroids. The quantity of steam employed must be at least sufficient in total enthalpy content to vaporize substantially all solvent present in the emulsified lacquer. To accomplish this there must be sufficient releasable heat energy in the steam employed to (1) heat the entire lacquer-in-water emulsion which is sprayed up to the boiling point of the solvent present in the emulsion, and (2) vaporize substantially all of this solvent. The minimum quantity of heat energy to accomplish this, and hence, the minimum quantity of steam required to supply this amount of releasable energy is readily calculated for any particular case from the following readily available and determinable facts:

(1) Weight of emulsion being sprayed per unit of time, (2) Specific heat of each of the several ingredients in the emulsion (minor ingredients such as the emulsifying agent can be disregarded because the amount involved is relatively insignificant in relation to the major ingredients including the cellulose derivative, the water, and the solvent which are employed), (3) Heat of vaporization of each of the solvent ingredients in the emulsified lacquer, and (4) The enthalpy content of the steam. Enthalpy is defined as the heat content, H, per unit mass expressed in British thermal units per pound, and is expressed by the following equation:

$$H \text{ (enthalpy)} = E + \frac{PV}{J}$$

where E is the internal energy, P is the absolute pressure in lb. per sq. ft., V is specific volume in cubic feet per lb. and J is joules equivalent (778 foot pounds per British thermal unit).

Any quantity of steam in excess of the minimum quantity can be employed. However, it is obvious that any large excess would be wasteful, and in practice the quantity of steam in excess over the minimum required is usually limited to an amount sufficient to take care of unavoidable heat losses to the surroundings and to mechanically sweep the solvent vapors from the stripping column into the vapor line.

The flash evaporation of the solvent from the emulsion droplets precipitates the organosoluble cellulose derivative composition as uniformly small, solid spheroid particles which then form a suspension in the water present in the sprayed emulsion, augmented, of course, with the water formed in the stripping column as a result of steam condensation. This water suspension of precipitated solid spheroids settles by gravity to the base of the column, and the suspension is withdrawn from the column continuously or intermittently, as desired.

The tiny precipitated spheroids of cellulose derivative composition are readily recovered from the water suspension thereof by any convenient dewatering means such as filtration, centrifugation, and the like, followed by conventional drying of the resulting moist mass of particles, such as tray drying in an air oven or vacuum oven, drying in this layers by infrared heating, and the like. If desired, the water suspension as withdrawn from the stripping column can be drum dried directly to obtain the finely-divided cellulose derivative composition in dry form.

Solvent vapors mixed with water vapor are continuously withdrawn from the stripping column through a vapor line, from which they are delivered to an ordinary atmospheric condenser. Condensed solvents are then recovered and separated from the condensed water by decantation and by distillation and are then available for re-use in the process.

The present invention is a distinct improvement over previously proposed methods for preparing tiny spheroids of organosoluble cellulose derivatives in that it is generally applicable to all organosoluble celluose derivatives without limitation or restriction, and avoids the necessity of recovering solvent vapors from large volumes of air or other ordinarily noncondensable gas. Moreover, it avoids coagulation difficulties which are likely to arise with emulsions of the lower fatty acid esters of cellulose, such as cellulose acetate, when attempts are made to boil off solvents from such emulsions in bulk.

This application is a continuation-in-part of my copending application, Serial No. 225,271, filed May 8, 1951, now Patent No. 2,740,723.

What I claim and desire to protect by Letters Patent is:

1. The process for preparing uniformly small, solid spheroid particles of organosoluble cellulose derivative composition which consists essentially of emulsifying a lacquer in water to form a lacquer-in-water emulsion, said lacquer containing organosoluble cellulose derivative composition dissolved in a low-boiling substantially water-immiscible solvent therefor, said solvent having a boiling point below the boiling point of water, forming fine mist-like droplets of the lacquer-in-water emulsion by spraying said emulsion at a temperature below the boiling point of the lacquer solvent therein into an enclosed vessel containing a steam atmosphere at substantially atmospheric pressure adjacent the top thereof, simultaneously introducing a quantity of steam into the enclosed vessel adjacent the lower end thereof sufficient in total enthalpy content to vaporize substantially all of the low-boiling substantially water-immiscible solvent from the emulsion droplets, evaporating substantially all of the low-boiling substantially water-immiscible solvent from the emulsified lacquer droplets by steam stripping while said emulsified lacquer droplets are descending through the steam atmosphere to precipitate substantially all of the organosoluble cellulose derivative composition as uniformly small, solid spheroids having diameters not exceeding about 5 microns in the water of the descending emulsion droplets, settling the water droplets containing the precipitated spheroids to form a water suspension of said spheroids in the bottom of the vessel, withdrawing vapors consisting essentially of a mixture of solvent vapor and water vapor from the enclosed vessel, and withdrawing the water suspension of solid spheroids from the enclosed vessel.

2. The process in accordance with claim 1 wherein the organosoluble cellulose derivative is a lower fatty acid ester of cellulose.

3. The process in accordance with claim 1 wherein the organosoluble cellulose derivative is cellulose acetate.

4. The process in accordance with claim 1 wherein the organosoluble cellulose derivative is nitrocellulose.

5. The process in accordance with claim 1 wherein the organosoluble cellulose derivative is a cellulose ether.

6. The process in accordance with claim 1 wherein the organosoluble cellulose derivative is ethyl cellulose.

References Cited in the file of this patent

UNITED STATES PATENTS

| | | |
|---|---|---|
| 1,133,051 | Merrell | Mar. 23, 1915 |
| 1,921,582 | Pratt | Aug. 8, 1933 |
| 2,138,137 | Bowlby | Nov. 29, 1938 |
| 2,308,664 | Young et al. | Jan. 19, 1943 |
| 2,460,546 | Stephanoff | Feb. 1, 1949 |
| 2,510,834 | Phillips | June 6, 1950 |
| 2,722,528 | Johnson | Nov. 1, 1955 |